A storage system query mechanism and corresponding techniques for implementing queries are provided. In an exemplary method, control path data in a storage array is processed by obtaining an object model (OM) data object comprising retrieved control path data upon an initial user request; storing the OM data object in a cache using one or more façade data classes; employing a refresh service to listen to refresh events that impact a validity of the OM data object, wherein the OM data object is evicted from the cache when the validity of the OM data object is impacted by one of the refresh events; and delivering the OM data object from the cache upon a subsequent user request if the OM data object remains in the cache at a time of the subsequent user request.

(12) United States Patent
Liubovich et al.

(10) Patent No.: US 11,144,551 B2
(45) Date of Patent: Oct. 12, 2021

(54) STORAGE SYSTEM QUERY MECHANISM AND TECHNIQUES

(71) Applicant: EMC IP Holding Company LLC, Hopkinton, MA (US)

(72) Inventors: Ilya Liubovich, Shrewsbury, MA (US); Ruben Michel, Hopkinton, MA (US); Satish Suryanarayan, Austin, TX (US); Ohad Zeliger, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 235 days.

(21) Appl. No.: 16/369,904

(22) Filed: Mar. 29, 2019

(65) Prior Publication Data
US 2019/0236066 A1 Aug. 1, 2019

Related U.S. Application Data

(62) Division of application No. 14/282,599, filed on May 20, 2014, now Pat. No. 10,296,618.

(51) Int. Cl.
*G06F 16/00* (2019.01)
*G06F 16/2455* (2019.01)
*G06F 16/25* (2019.01)

(52) U.S. Cl.
CPC ........ *G06F 16/2455* (2019.01); *G06F 16/252* (2019.01)

(58) Field of Classification Search
None
See application file for complete search history.

(56) References Cited

U.S. PATENT DOCUMENTS

| | | | |
|---|---|---|---|
| 6,907,546 B1 | 6/2005 | Haswell et al. | |
| 6,985,912 B2 * | 1/2006 | Mullins | G06F 12/0815 |
| 7,461,077 B1 | 12/2008 | Greenwood et al. | |
| 7,603,677 B2 * | 10/2009 | Mukundan | G06F 9/547 |
| | | | 719/330 |
| 7,617,479 B2 * | 11/2009 | Hambrick | G06F 8/20 |
| | | | 717/104 |

(Continued)

OTHER PUBLICATIONS

Max Heiber, Problems with sending SQL Strings to Databases (and partial solutions) pp. 1-7, downloaded on Feb. 16, 2017 from https://medium.com/@maxheiber/sql-query-builders-what-are-they-good-for-967f5f6242f1#.a3c0ehxrm (2016).

*Primary Examiner* — Jean M Corrielus
(74) *Attorney, Agent, or Firm* — Ryan, Mason & Lewis, LLP

(57) ABSTRACT

20 Claims, 14 Drawing Sheets

(56) References Cited

U.S. PATENT DOCUMENTS

| | | | |
|---|---|---|---|
| 7,685,241 B2* | 3/2010 | Crawford | A63F 13/12 709/206 |
| 7,702,646 B2 | 4/2010 | Rabines et al. | |
| 7,769,747 B2* | 8/2010 | Berg | G06F 9/4493 707/716 |
| 7,831,693 B2* | 11/2010 | Lai | G06Q 10/10 709/220 |
| 7,895,241 B2* | 2/2011 | Schoen | G06F 16/20 707/802 |
| 7,941,438 B2 | 5/2011 | Molina-Moreno et al. | |
| 8,447,873 B1 | 5/2013 | Joyce et al. | |
| 9,075,667 B2 | 7/2015 | Torgersen et al. | |
| 9,531,720 B2* | 12/2016 | Zhang | H04L 63/1458 |
| 9,703,675 B2 | 7/2017 | Reid, III et al. | |
| 10,324,690 B2* | 6/2019 | Ouali | G06F 11/3696 |
| 10,636,084 B2* | 4/2020 | Grandcolas | G06Q 40/02 |
| 2003/0088713 A1* | 5/2003 | Mandal | G06F 12/0871 719/328 |
| 2004/0123048 A1* | 6/2004 | Mullins | G06F 16/9574 711/141 |
| 2004/0177080 A1 | 9/2004 | Doise et al. | |
| 2004/0216086 A1 | 10/2004 | Bau | |
| 2005/0120332 A1* | 6/2005 | Martin | G06Q 10/10 717/105 |
| 2006/0149914 A1 | 7/2006 | Doris et al. | |
| 2006/0195460 A1 | 8/2006 | Nori et al. | |
| 2006/0269148 A1* | 11/2006 | Farber | G06Q 40/00 382/232 |
| 2007/0094647 A1 | 4/2007 | Meijer et al. | |
| 2007/0124276 A1 | 5/2007 | Weissman et al. | |
| 2007/0220013 A1 | 9/2007 | Rabines et al. | |
| 2008/0065634 A1 | 3/2008 | Krinsky et al. | |
| 2009/0132995 A1 | 5/2009 | Iborra et al. | |
| 2010/0205206 A1 | 8/2010 | Rabines et al. | |
| 2010/0299660 A1 | 11/2010 | Torgersen et al. | |
| 2011/0088011 A1 | 4/2011 | Quail et al. | |
| 2011/0258593 A1 | 10/2011 | Ng et al. | |
| 2012/0054178 A1 | 3/2012 | Tran | |
| 2012/0123996 A1 | 5/2012 | Krinsky et al. | |
| 2014/0109037 A1 | 4/2014 | Quail et al. | |
| 2014/0236884 A1 | 8/2014 | Clark et al. | |
| 2015/0040103 A1* | 2/2015 | Nyisztor | G06F 8/71 717/121 |
| 2015/0040104 A1* | 2/2015 | Mall | G06F 9/44505 717/121 |
| 2018/0024814 A1 | 1/2018 | Quail et al. | |

\* cited by examiner

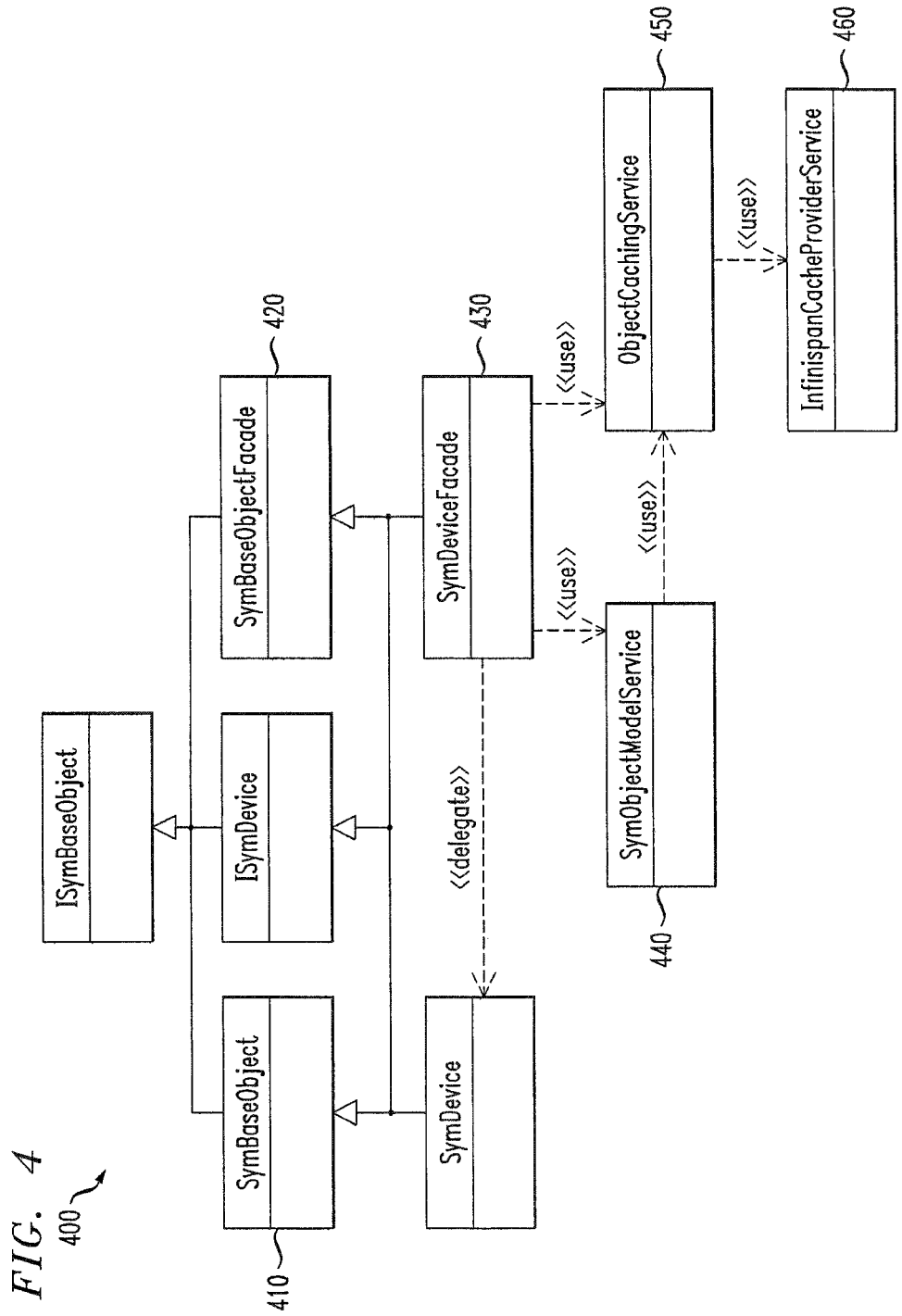

FIG. 5A

```
From the base class, SymBaseObjectFacade:

/**
* Utility to return the "real" object behind this facade. The object
* returned is the item that the facade is managing. E.g. for a SymmetrixFacade
* this would be the Symmetrix object.
* @throws ItemNotFoundException is the object is not found (using the facade's key)
*/
protected com.emc.em.domain.symmetrix.om.datamodelbase.SymBaseObject getThisObject() throws ItemNotFoundException com.emc.em.domain.symmetrix.om.datamodelbase.SymBaseObject obj = null;

if(weak_ref != null)
{
    obj = (com.emc.em.domain.symmetrix.om.datamodelbase.SymBaseObject)weak_ref.get();
    if((obj != null) && obj.isRemovedFromCache()) {
        obj = null; // we don't want to use if the obj has been removed
    }
}
```

```
if(obj == null) {
    // look in cache
    obj = (com.emc.em.domain.symmetrix.om.datamodelbase.SymBaseObject)getCache().lookup(getKey());
    if (obj == null) {
        // not in cache - get from session
        try {
            ISymObjectModelService svc = getOMService();
            if (svc == null) {
                throw new ItemNotFoundException("Cannot find Object Model service");
            }
            SymBaseObjectFacade facade = (SymBaseObjectFacade)svc.lookupObject(getKey());
            // strip the facade to get the object behind it
            obj = facade.getThisObject();
        } catch (ItemNotFoundException ex) {
            EMLogger.objModel.error("EMObjectFacade", "getThisObject",
                "Cannot find" + getKey(), ex);
            throw ex;
        }
        // no need to store in cache - the OM Service has done that already
        weak_ref = new WeakReference(obj);
    }
    return obj;
}
```

FIG. 6A

```
                                                        ┌─ 600-1
The PerUserRelationshipKey class:

package com.emc.em.domain.symmetrix.om.datamodelbase;

import ...

public class PerUserRelationshipKey extends RelationshipKey { private IUser user;

public PerUserRelationshipKey(IEMObjectKey parent, String relname) {
    super(parent, relname);
    this.user = UserContext.getUserIfSet();
  } public IUser getUser() {
    return user;
  } public String toString()
  {
    return super.toString() + "." + getNonNullUserString();
  } public int hashCode()
  {
    return super.hashCode() + getNonNullUserString().hashCode();
  }
```

```
public boolean equals(Object other)
{
    if (null == other)
        return false;
    if ( ! (other instanceof PerUserRelationshipKey))
        return false;
    PerUserRelationshipKey otherKey = (PerUserRelationshipKey) other;
    return super.equals(otherKey) && getNonNullUserString().equals(otherKey.getNonNullUserString());
} private String getNonNullUserString() {
    if (null == user)
        return "NoUser";
    else
        return user.toString();
}

Lookup relationship in cache

PerUserRelationshipKey relKey = new PerUserRelationshipKey(getKey(), RELATIONSHIP_ALL_SYMMS);
Collection<ISymmetrix> symms = (Collection<ISymmetrix>) getCache().lookup(relKey);
```

FIG. 8

| NAME | POOL NAME | TYPE | EMULATION | ALLOCATED % | CAPACITY (GB) | STATUS | RESERVED | PATHS |
|---|---|---|---|---|---|---|---|---|
| 015F | jrmSampleFLM | TDEV | FBA | 100% | 8.44 | READY | NO | 2 |
| 0160 | N/A | TDEV | FBA | 0% | 8.44 | NOT READY | NO | 0 |
| 0161 | jrmSampleFLM | TDEV | FBA | 100% | 8.44 | READY | NO | 2 |
| 0162 | jrmSampleFLM | TDEV | FBA | 100% | 8.44 | READY | NO | 2 |
| 0163 | jrmSampleFLM | TDEV | FBA | 100% | 8.44 | READY | NO | 2 |
| 0164 | jrmSampleFLM | TDEV | FBA | 100% | 8.44 | READY | NO | 2 |
| 0165 | jrmSampleFLM | TDEV | FBA | 100% | 8.44 | READY | NO | 2 |
| 0166 | N/A | TDEV | FBA | 0% | 8.44 | NOT READY | NO | 0 |
| 0167 | N/A | TDEV | FBA | 0% | 8.44 | NOT READY | NO | 0 |
| 0168 | N/A | TDEV | FBA | 0% | 8.44 | NOT READY | NO | 0 |
| 0169 | N/A | TDEV | FBA | 0% | 8.44 | NOT READY | NO | 0 |
| 016A | jrmSampleFLM | TDEV | FBA | 100% | 8.44 | READY | NO | 2 |
| 016B | jrmSampleFLM | TDEV | FBA | 100% | 8.44 | READY | NO | 2 |
| 016C | jrmSampleFLM | TDEV | FBA | 100% | 8.44 | READY | NO | 2 |
| 016D | N/A | TDEV | FBA | 0% | 8.44 | NOT READY | NO | 0 |
| 016E | TEST | TDEV | FBA | 100% | 1 | READY | NO | 0 |
| 016F | TEST | TDEV | FBA | 0% | 0.18 | READY | NO | 0 |

| NAME | POOL NAME | TYPE | EMULATION | ALLOCATED % | CAPACITY (GB) | STATUS | RESERVED | PATHS |
|---|---|---|---|---|---|---|---|---|
| 0126 | TEST | TDEV | FBA | 100% | 1.6 | READY | NO | 0 |
| 0127 | TEST | TDEV | FBA | 100% | 1.6 | READY | NO | 0 |
| 0128 | N/A | TDEV | FBA | 0% | 1.6 | NOT READY | NO | 0 |
| 0129 | N/A | TDEV | FBA | 0% | 1.6 | NOT READY | NO | 0 |
| 012A | N/A | TDEV | FBA | 0% | 1.6 | NOT READY | NO | 0 |
| 012B | N/A | TDEV | FBA | 0% | 1.6 | NOT READY | NO | 0 |
| 012C | N/A | TDEV | FBA | 0% | 1.6 | NOT READY | NO | 0 |
| 012D | N/A | TDEV | FBA | 0% | 1.6 | NOT READY | NO | 0 |
| 012E | N/A | TDEV | FBA | 0% | 1.6 | NOT READY | NO | 0 |
| 012F | N/A | TDEV | FBA | 0% | 1.6 | NOT READY | NO | 0 |
| 0130 | RAID-6... | TDEV | FBA | 100% | 175.46 | READY | NO | 0 |
| 0131 | RAID-6... | TDEV | FBA | 0% | 175.46 | READY | NO | 0 |
| 0132 | RAID-6... | TDEV | FBA | 0% | 175.46 | READY | NO | 0 |
| 0133 | RAID-6... | TDEV | FBA | 0% | 175.46 | READY | NO | 0 |
| 0134 | RAID-6... | TDEV | FBA | 0% | 175.46 | READY | NO | 0 |
| 0135 | RAID-6... | TDEV | FBA | 0% | 176.46 | READY | NO | 0 |
| 0136 | RAID-6... | TDEV | FBA | 0% | 175.46 | READY | NO | 0 |

STORAGE SYSTEM QUERY MECHANISM AND TECHNIQUES

CROSS-REFERENCE TO RELATED APPLICATION

This application is a divisional of U.S. patent application Ser. No. 14/282,599 filed on May 20, 2014, (now U.S. Pat. No. 10,296,618), which claims priority to U.S. Provisional Application Ser. No. 61/825,285, filed May 20, 2013, entitled "Storage System Query Mechanism and Techniques," incorporated by reference herein.

FIELD

Aspects of the present invention are related to techniques for implementing queries for a storage system, including, but not limited to designing, creating and executing queries.

BACKGROUND

Many conventional storage systems include one or more client devices connected over one or more networks to one or more storage management servers. Generally, storage management servers manage storage for, and are connected by, one or more networks to one or more storage arrays. Such systems can suffer from one or more performance issues, such as too much (i) storage space consumed on client devices and/or server devices by query data, (ii) computing resources consumed on client devices and/or server devices as a results of query-related activity; and (iii) network congestion between client devices, server devices and/or storage arrays as a result of query-related activity.

A need therefore exists for improved methods, systems and techniques for implementing queries that can help address one or more of the foregoing performance issues, and thereby help improve the query performance and/or overall system performance of a storage system.

SUMMARY OF THE INVENTION

Illustrative embodiments of the present invention provide a storage system query mechanism and corresponding techniques for implementing queries. In one or more embodiments, control path data in a storage array is processed by obtaining an object model (OM) data object comprising retrieved control path data upon an initial user request; storing the OM data object in a cache using one or more façade data classes; employing a refresh service to listen to refresh events that impact a validity of the OM data object, wherein the OM data object is evicted from the cache when the validity of the OM data object is impacted by one of the refresh events; and delivering the OM data object from the cache upon a subsequent user request if the OM data object remains in the cache at a time of the subsequent user request.

Advantageously, illustrative embodiments of the invention provide improved processing of queries. These and other features and advantages of the present invention will become more readily apparent from the accompanying drawings and the following detailed description.

BRIEF DESCRIPTION OF DRAWINGS

FIG. 4 is a UML model diagram illustrating an example of class objects for OM façades that may be used in accordance with one aspect of the invention;

FIGS. 5A and 5B, collectively, provide exemplary pseudo code for implementing OM façades in accordance with one aspect of the invention;

FIGS. 6A and 6B, collectively, provide exemplary pseudo code for implementing OM façades for relationship objects;

FIG. 8 illustrates a portion of an exemplary screen shot presenting a non-limiting example of a SADG GUI display component incorporating aspects of the present invention;

FIG. 10 illustrates a portion of an exemplary screen shot presenting a non-limiting example of a SADG GUI display component incorporating aspects of the present invention.

DETAILED DESCRIPTION

Figure 1:
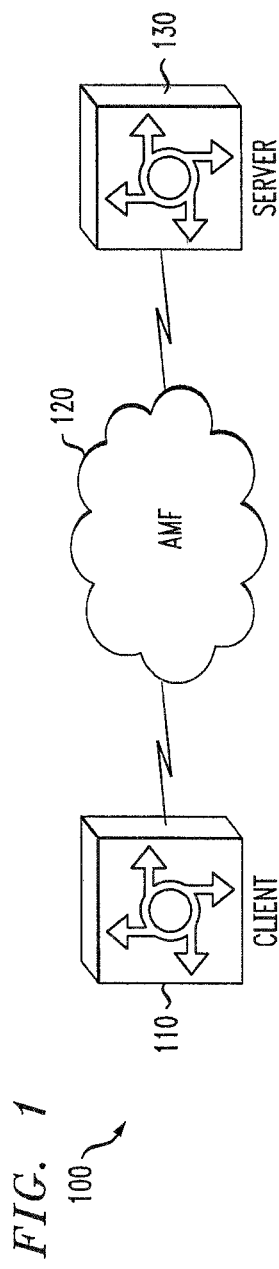
FIG. 1 illustrates an exemplary network environment in which the present invention may be employed.

Aspects of the present invention provide improved methods, systems and techniques for implementing queries that can help address one or more of the foregoing performance issues, and thereby help optimize the query performance and/or overall system performance of a storage system. The embodiments described herein may be applicable to any type of storage system, including, but not limited to, a network-attached storage system (NAS), a Storage Area Network (SAN), or suitable combination of the foregoing, and may incorporate one or more of the components and techniques described in U.S. Pat. No. 8,433,848, the contents of which are hereby incorporated by reference. Further, it should be appreciated that the embodiments described herein are not limited to storage systems, but may be applied to any system in which queries are performed such as, for example, a database management system.

In some embodiments, strongly-typed (or at least mostly strongly typed) queries are employed to target object models (OMs), for example, arbitrary OMs. Strong typing is a programming language characteristic that provides strict adherence to the rules of typing. Data of one type (integer, string, etc.) cannot be passed to a variable expecting data of a different type. A strongly typed language has a type system that is checked at compile time by the implementation (a compiler or interpreter). The type check rejects some programs, and programs that pass the check usually come with some guarantees; for example, the compiler guarantees not to use integer arithmetic instructions on floating-point numbers. One benefit of such strong typing is that, during query development, e.g., using an Integrated Development Environment (IDE), when a given object type is specified, a list of attributes and methods can be presented to the programmer, thus facilitating query development. Another benefit is that a compiler can detect invalid object types at compile time (as opposed to run-time), thereby reducing potential run-time errors.

In some embodiments, an expressive query language may be provided. The query language may enable accurate specification of data needed to display by a user, for example, by a client module in a storage system. A query builder may be provided that enables construction of strongly typed (or at least a mostly strongly typed) queries, for example, by the client module or server module, due to a meta-model generated for both client and server languages. As discussed further below in conjunction with FIG. 2, a query may be sent (e.g., by the client 110) to a query service (QS), e.g., on a server module of the storage system, which may be on a separate device than the client module. The query may specify an OM traversal, and the QS may execute the query-specified OM traversal. To enhance performance, in an embodiment in which the QS resides on a server, the QS may delegate aspects of the query processing to one or more server-side caches, thereby reducing remote-subsystem invocations. In some embodiments, the QS returns back to the client only the data required by the client module at that time, as is described in more detail below. The QS may partition large query responses into pages, and deliver pages on demand to a client module.

Employing such querying techniques and mechanisms, which are described in more detail below, may reduce network traffic, and, in some embodiments, a client module need not perform any calculation other than displaying a view of query results to a user.

In some embodiments of the invention, a graphical user interface (GUI) is provided that includes a data grid (DG) component (e.g., SADG, described below), for displaying data in tabular form. In some embodiments, the DG component may be configured to operate in either of two modes: a presenter populated data grid (P-DG) mode, or a query-service populated data grid (QS-DG) mode. In P-DG, the presenter in the Model-View-Presenter (MVP) architecture, may procedurally populate the P-DG's data provider, which is a typical ActionScript practice. In QS-DG mode, the tabular population may be specified declaratively by a QS query, and the DG component may be configured to determine when to execute the query and when to page the query result, for example, as a user of the GUI scrolls through the subject table.

As noted above, the DG component may be a declarative GUI component, such that programmers may program what the DG component should execute and the DG component may determine when and how to execute. The DG component may optionally support server-side scrolling and sorting. In contrast, typical GUI components perform scrolling and sorting in the GUI client, which is generally not appropriate for complex storage systems. The DG component may be configured to abstract away query execution and paging (thereby relieving the MVP presenter from such tedium), server-side scrolling and/or columnar sorting. The DG component may be configured to minimize client/server roundtrips and network traffic, only retrieving from the server the minimum amount of data that the user requires at any given time.

A DG component configured with one or more of the features described above eases GUI development, and reduces computations and network traffic.

In some embodiments of the invention, a query filter is provided, for example, as described in more detail below. In some embodiments, the query filter may leverage existing filtering capabilities provided by a storage array.

In some embodiments of the invention, the storage system includes any of an EMC® Symmetrix® storage array or EMC® VMAX® storage array, and one or more of the functions, methods or acts described herein are performed by a Unisphere® for VMAX (Univmax) storage management module. In such a system, the client may execute within a Flash player in the browser, and the server may execute on, for example, a JBoss Application Server running on a Java virtual machine (JVM). The client and server in the exemplary embodiments may communicate using Granite Data Services (GraniteDS) over the Action Message Format (AMF) binary protocol, for example, as illustrated in FIG. 1.

FIG. 1 illustrates an exemplary network environment 100 in which the present invention may be employed. As shown in FIG. 1, an exemplary client 110 communicates with a server 130 in an exemplary storage system over one or more networks 120 using an exemplary AMF binary protocol. FIG. 1 is merely an illustrative embodiment of a storage system, and is not intended to limit the scope of the invention. Any of numerous other implementations of a storage system, for example, variations of such system, are possible and are intended to fall within the scope of the invention. For example, in some embodiments, AMF may not be employed. Although not shown in FIG. 1, the server 130 may be connected to one or more storage arrays that are serviced by the server 130.

The exemplary server 130 may model the many facets of the complex storage environment using multiple OMs, including, but not limited to OMs for: scheduled jobs, storage array (e.g., Symmetrix) alerts, storage array (e.g., Symmetrix) audit logs, storage array (e.g., Symmetrix) management, storage array (e.g., Symmetrix) performance statistics, etc. The client may expose carefully crafted views of the OMs, involving complex OM traversals.

While the client 110 could simply request all the OM information from the server 130 and execute the traversals in the client 110, aspects of the present invention recognize that bringing all of that information from the server 130 to the client 110 would require time-consuming server serialization, network transfer, and finally client de-serialization. Consequently, the client 110 would overwhelm the server 130, the network(s) 120, and the client 110.

To address these issues, in some embodiments, an expressive query language is provided that allows the client 110 to specify accurately the data needed for displaying each view.

Query Service

Figure 2:
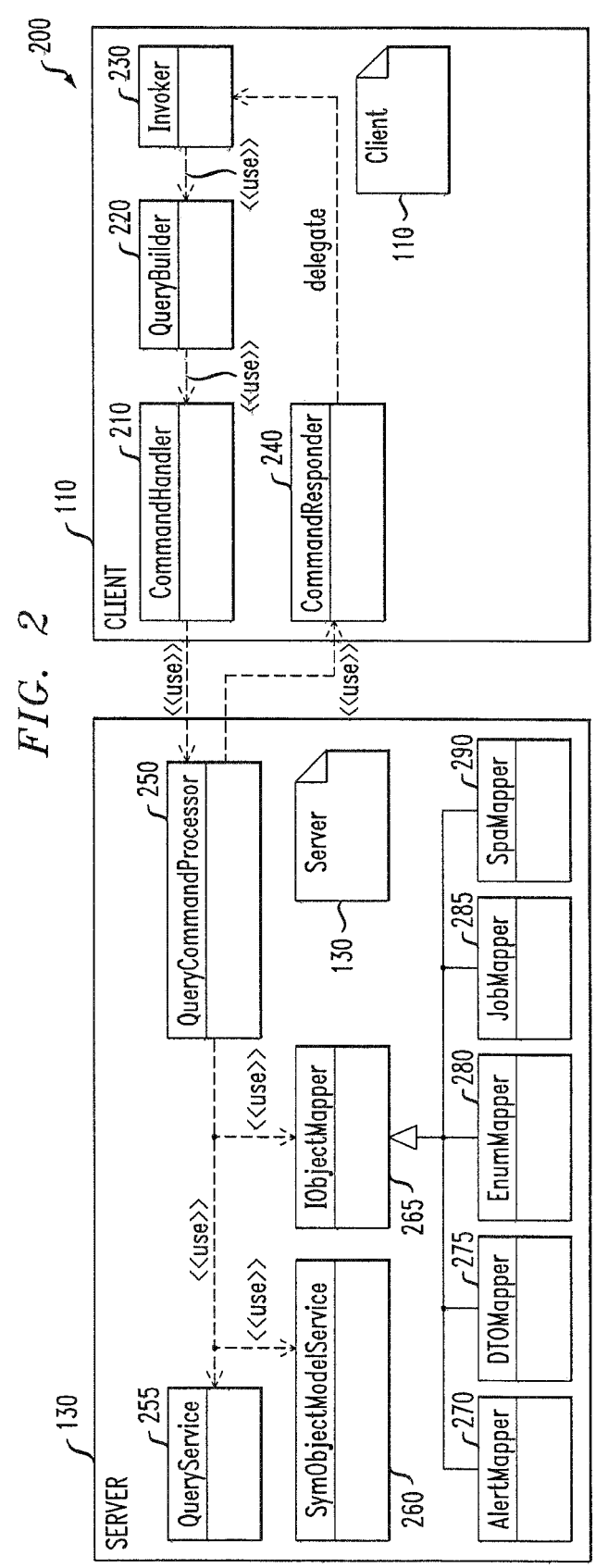
FIG. 2 is a Unified Modeling Language (UML) model diagram illustrating an exemplary client and exemplary server of FIG. 1 in further detail.

FIG. 2 is a diagram illustrating an exemplary client 110 and exemplary server 130 of FIG. 1 in further detail. The exemplary client 110 and exemplary server 130 shown in FIG. 2 comprise aspects of an exemplary query mechanism (QM) that may be used in connection with performing techniques described herein. FIG. 2 is merely an illustrative embodiment of such aspects, and is not intended to limit the scope of the invention. Any of numerous other implementations of aspects of a QM, for example, variations of such aspects, are possible and are intended to fall within the scope of the invention. For example, in some embodiments, one or more elements residing in the client 110 may reside in the server 130, and vice versa.

A QM may include any of the following subsystems: a front end (FE), which may contain a query builder, a back-end, which may contain a query execution engine, and a language translator layer (e.g., GraniteDS) for marshalling between an ActionScript client and a Java server. While the query builder may be made available both on a client and a server, in some embodiments, it may be desirable that the query execution engine resides solely on the server.

As shown in FIG. 2, the exemplary client 110 comprises a command handler 210, a client-side query builder 220, an invoker 230 and a command responder 240. The exemplary server 130 comprises a query command processor 250, a query service 255, a SymObjectModelService 260, an iObjectMapper 265, an alertMapper 270, a DTOMapper 275, an EnumMapper 280, a JobMapper 285 and a SpaMapper 290. Generally, for every object model, a different mapper can be provided, the IObjectMapper 265 selects the appropriate mapper to apply to the results of a particular query.

In further variations, the client 110 may not implement a QueryBuilder 220 and/or the server 130 may not implement a query service 255 or a paging service (described in more detail below in conjunction with FIG. 7). Thus, the server 130 may also optionally comprise a server-side query builder (not shown in FIG. 2).

Armed with the query builder 220, the client 110 can build a (e.g., mostly) strongly typed query. The client 110 delegates the query to the command handler 210 which can dispatch the query to the server 130, where the query service 255 may execute the query-specified OM traversals. As shown in FIG. 2, the command handler 210 sends the query to the query command processor 250 in the server 130, which delegates to the query service 255. The query service 255 obtains information regarding objects from the exemplary SymObjectModelService 260.

In the exemplary embodiment of FIG. 2, the query command processor 250 is configured as a (e.g., server-side) Spring bean that manages client-side queries following HTTP lifecycles. The query command processor 250 may be configured to handle the following three exemplary command types:

QueryCommand, indicating the execution of a new client query.
PagingCommand, indicating that the client is paging the query result.
PagerCloseCommand, indicating that the client no longer needs the query result.

The query command processor 250 may be configured to perform any of: validate and authorize the input, dispatch the query to the query service for execution, and select an appropriate mapper for translating the query result into DTOs for further client processing.

The query result is returned in the language of the object model and the IObjectMapper 265 or the appropriate domain-specific alertMapper 270, DTOMapper 275, EnumMapper 280, JobMapper 285 or SpaMapper 290 convert the query result to a data transfer object, as discussed further below. Spring may inject the OM-specific mappers into the query command processor 250 through, for example, the @Autowired annotation. To generate the DTOs, the query command processor 250 may be configured to use Java reflection. For projection queries, the query command processor 250 may be configured to populate just the projected fields, otherwise all fields may be populated.

To enhance performance, the QS 255 may (e.g., often) delegate to server-side caches, as discussed further below in conjunction with FIGS. 4-6, reducing remote-subsystem invocations. The QS 255 may dispatch back to the command responder 240 in the client 110 precisely the required data. Consequently, network traffic may be (e.g., optimally) reduced and the thin client 110 need not perform any calculation—other than displaying the view. To further reduce computations and network traffic, the query server 130 may partition large responses into pages, (e.g., "lazily") delivering pages on demand.

As used herein, the one or more components and/or techniques that may be configured/employed to implement one or more aspects of the invention may be referred to collectively as the "QM". In some embodiments of the invention, the QM may be configured to provide one or more of the following properties or functions:

Supports multiple OMs;
Allows access to OM attributes and relationships;
Provides client and server access to the OMs;
(E.g., mostly) strongly-typed, a benefit of which is that a compiler can detect query errors, such as accessing non-existing attributes or relationships;
The query syntax is straightforward and easy to learn;
Supports meta-data driven views;
Blocks unauthorized OM elements;
OM lookup;
OM filtering;
OM relationship traversal;
OM element projection (allowing queries for just those specific properties of an entity that are needed, at lower latency and cost than retrieving the entire entity);
Serializing and de-serializing queries;
Paging large result sets;
Sorting;
Aggregating: max, min, avg, etc.; and
Scales to support hundreds of storage (e.g., Symmetrix) arrays each featuring millions of storage devices.

The QM may be configured to handle one or more of the following use cases that may be encountered by a storage system manager:

1. Display an OM property: Retrieve the capacity of a given storage (e.g., Symmetrix) device. As used herein, a "storage device" or sometimes "device" is a unit of storage, typically part of a storage array.
2. Navigate the OM: Given a storage (e.g., Symmetrix) array, retrieve all that storage array's devices.
3. Filter the OM: Dialogs and wizards require filtering, e.g., display just Fixed Block Architecture (FBA) devices.

Currently, Java features two primary query standards: Java Persistence API (JPA) and Java Data Objects (JDO). JPA targets Object-Relational mapping technologies such as Hibernate, Toplink, and OpenJPA. JPA is used extensively in J2EE containers, Tomcat, and Spring. JDO is an Apache JCP standard targeting Object-based implementations. Thus, in addition to relational databases, JDO can also support object databases, flat files, and other database technologies. Both the JPA and JDO standards support string-based query languages. JPA 2.0 added Criteria Query, which is a strongly-typed query language. Criteria Query provides type safety by generating meta-data classes, capturing the domain's attributes and relationships. Following is a list of related query technologies:

OpenJPA
Hibernate
JPA type safe queries
Castor (XML serialization)
OODT queries (meta-data management project)
ObjectStore (Object DB)
JDO
LiquidForm (a front end for JPA queries)

With the exception of LiquidForm, the current technologies provide a fully-integrated, vertical implementation stack from Java to the database. In contrast, storage system manager (e.g., Univmax) OMs may be mostly transient, acquiring data at runtime (e.g., through Solution Enabler in the case of VMAX). The LiquidForm project provides strongly typed queries that translate to JPA strings; however, LiquidForm does not support ActionScript.

The QM can reuse current technologies and simplify migration if OMs migrate to commercial databases.

The query builder 220 (e.g., QueryBuilder) is a factory for queries. After the client 110 populates the query, the query builder 220 may execute the query, retrieve results, retrieve paged results, and close the server-side pager. On the client 110, the query builder 220 may be implemented as an injectable Parsley object. Parsley is an Open Source Framework for Flex that allows, e.g., injection and raising an event in code that is received by a listener using message handlers (in a similar manner as the Spring Framework for Java or the Contextual Dependency Injection (CDI) for Java).

The pager service, discussed further below in conjunction with FIG. 7, (e.g., PagerService) may be implemented as a (e.g., server-side) singleton managing paged results.

A saved-query service (not shown) may be implemented as a (e.g., server-side) singleton for managing named persisted queries.

The query service 255 (e.g., QueryService) may be implemented as a (e.g., server-side) stateless bean supporting client- and server-side queries. In addition, the query service 255 may expose the functionality of both the pager service (FIG. 7) and saved query service (not shown).

An (e.g., Symmetrix) OM provider (SymOMProvider) (FIG. 7) supports object lookup by key and may expose a custom query executor. OM provider (FIG. 7) may expose custom comparators for the (e.g., Symmetrix) OM.

The query builder 220 may expose a client API of the QM. As discussed further below in conjunction with FIGS. 3 and 7, according to various aspects of the invention, the query builder 220 may include generic and domain-specific components. The generic component may include any of: query creation, query execution, and base classes for all queries. The domain-specific component may include classes that extend the generic component's base classes, which may reflect OM attributes and relationships. While a generic component is entirely hand coded, the domain-specific component can be either hand coded or generated from OMs, for example, using Velocity templates.

As mentioned above, the query builder 220 may be made available on both the client 110 and the server 130. The client side query builder 220 may be a translation of the Java classes of the server 130 into ActionScript.

Figure 3:
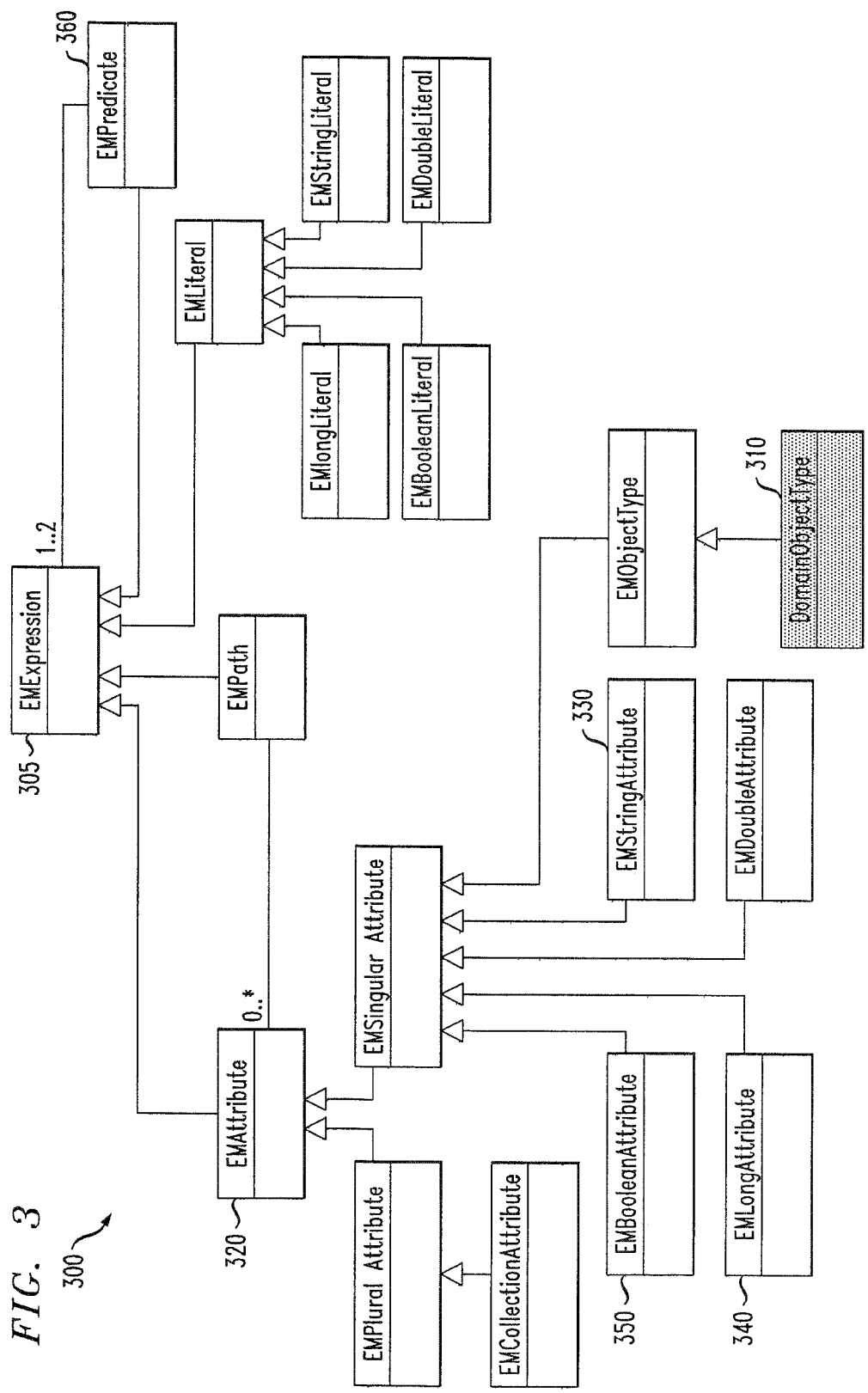
FIG. 3 is a UML diagram illustrating an example of a meta model of the query builder of FIG. 2 that may be used in connection with performing the techniques described herein.

FIG. 3 is a UML model diagram illustrating an example of a meta model 300 of a query builder 220 that may be used in connection with performing the techniques described herein. FIG. 3 is merely an illustrative embodiment of such a meta model 300, and is not intended to limit the scope of the invention. Any of numerous other implementations of meta model 300 of a query builder 220, for example, variations of the meta model 300 in FIG. 3, are possible and are intended to fall within the scope of the invention. In the exemplary notation of FIG. 3, the label "EM" indicates an Element Manager.

EmQuery (not shown) may be gradually populated with query data to build entire queries until execution. EmQuery may support: select( ), where( ), project( ), and sortBy( ).

EMExpression 305 is a super class for all expressions, such as, the size of a device is smaller than 5 GB.

EmAttribute 320 is the super class of all attribute types. EMAttribute extensions may add type-safe operators for: ints, longs, doubles, objects, etc.

EMStringAttribute 330, EmLongAttribute 340 and EmBooleanAttribute 350 are subclasses of the EmAttribute class 320 providing type-safe comparison operators.

EmPredicate 360 represents a predicate, i.e., an expression that evaluates to a boolean. The EMPredicate 360 may be built from either attribute comparison, or regex like, or the logic operators (and, or, negate).

EMQueryResult (not shown) is the result of either executing or paging a query.

EMQuery is a lightweight container of all parameters necessary for query execution. The EMQuery may be readily populated using an intuitive, fluent, mostly strongly typed, interface. The EMQuery may be built such that the building incurs no client/server communication, and the query service may be invoked only upon query execution.

According to one aspect of the invention, the meta model 300 comprises a plurality of base classes and a domain object type 310 that serves as a domain-specific injection point. In this manner, at least one domain specific meta-model can be injected into the base meta-model 300 at the domain-specific injection point 310. Thus, the domain-specific injection point 310 allows the base meta-model 300 to be extended with domain-specific classes and thereby customized for a plurality of domains, even after a commercial release of the Query Mechanism. The domain specific meta-model can be generated from a corresponding domain specific object model using one or more of code generation techniques and hand coding.

In the exemplary embodiments described herein, client code may be written in ActionScript (also known as Flex), while server code may be written in Java. To respond to client queries, the query service 255 may be configured to translate Java query results to ActionScript. The exemplary Data Transfer Objects, DTOs, are value types that may be configured to leverage the GraniteDS infrastructure to automate such translation.

For an exemplary Symmetrix OM, Java DTOs may be generated by a Univmax generator, which is a Velocity-based code generator. In turn, the GraniteDS Gas3 code generator may be configured to emit ActionScript DTOs from the generated Java DTOs. For other OMs, DTOs may be either hand-coded or generated.

A (e.g., Univmax) code generator may be configured to parse (e.g., Symmetrix) OM sources for creating an internal representation of the OM. Armed with that internal representation and Velocity templates, the generator then may be configured to emit multiple artifacts, including: server-side DTOs, Java and Flex meta data, Java and Flex enum DTOs, and OM Façades.

OM Façades

OM façades may minimize access to a storage array interface (SAI), for example, an API or command line interface (CLI) such as, for example, Solutions Enabler. On first access to an OM object, the QM (e.g., a Univmax within a QM) may create a corresponding façade, which is immediately placed in a cache, e.g., Infinispan. Any subsequent access to that same object retrieves the cached façade, rather than re-invoking the storage array interface.

FIG. 4 is a UML model diagram illustrating an example 400 of class objects for OM façades that may be used in connection with performing the techniques described herein.

FIG. 4 is merely an illustrative embodiment of such exemplary class objects 400, and is not intended to limit the scope of the invention. Any of numerous other implementations of exemplary class objects 400 for OM façades, for example, variations of the exemplary class objects 400 in FIG. 4, are possible and are intended to fall within the scope of the invention.

As shown in FIG. 4, for each base object 410, a corresponding base object façade 420 can optionally be provided, to facilitate caching of the base object 410. For base object façade 420, sub-classes comprise a device façade 430 containing the object model service 440 and object caching service 450 and a cache provider service 460.

FIGS. 5A and 5B, collectively, provide exemplary pseudo code 500 for implementing the OM façades. FIG. 5A provides a portion 500-1 of exemplary pseudo code 500 for returning the "real" object behind the façade, using weak garbage collection references. The object returned is the item that the façade is managing. For example, for an exemplary SymmetrixFaçade, the object returned is the Symmetrix object.

FIG. 5B provides a portion 500-2 of exemplary pseudo code 500 that determines if the desired object is stored in the cache. If the object is not stored in the cache, the storage array is accessed to obtain the desired object and the cache is updated.

Caches require cache-refreshing strategies. The refresh service may be configured to listen to SAI refresh events. When such an event arrives, the refresh service may be configured to evict all the impacted objects from the cache. Any subsequent access to an evicted object may immediately trigger an SAI call that repopulates the cache entry. As used herein, the term "control path data" shall comprise data about a given device such as device characteristics and/or performance.

In addition to OM façades, the cache also may store relationship objects, to expedite OM traversal. FIGS. 6A and 6B, collectively, provide exemplary pseudo code 600 for implementing the OM façades for relationship objects. The exemplary pseudo code 600 determines if the desired relationship object is stored in the cache, in a similar manner to FIGS. 5A and 5B. If the desired relationship object is not stored in the cache, the storage array is accessed to obtain the desired relationship object and the relationship cache is updated.

Query Language

The query builder 220 (FIG. 2) may expose a query language having the following exemplary components:

Query Origin (mandatory): The Query Origin is the start of the query navigation. The Origin, of IEmObjectKey type, is the parameter to QueryBuilder.createQuery( ). The semantics is that query execution will start from the origin object and follow the specified navigation path. Both JPA and JDO lack the Origin concept.

Select (optional): The select component specifies a metamodel traversal leading to the query target. The query target can be either a class or a collection. When the target is a class, the query will eventually retrieve an OM object in Java or a DTO in ActionScript. Similarly, when the query target is a collection, the query will eventually retrieve a collection of OM objects in java or a collection of DTOs in ActionScript. An empty select functions as a lookup, retrieving the OM object specified by the Origin object key.

Project (optional): In ActionScript, the project component specifies the target attributes that must be populated in the query result DTOs. For DTO classes carrying many attributes, the project component can dramatically reduce the computational and networking effort.

Where (optional): The where component specifies a filter applied to the query result. Specifically, the filter narrows the query result by removing non-matching objects.

OrderBy (optional): The orderBy component sorts the query result according to the specified attribute, sort order, and comparator.

byName: Execute a previously saved query. Obviously, this component disables all the previously mentioned components. The query name is specified through QueryBuilder.createNamedQuery(String).

Query Examples

Consider a query that aims to find the symm with name "123".

IEMObjectKey symm=new SymmetrixKey("123");
    IEmQuery q=QueryBuilder.createQuery(symm);

Consider another query that aims to select all the devices from a given storage array (e.g., Symmetrix):

IEMObjectKey symm=new SymmetrixKey("123");
    IEmQuery q=QueryBuilder.createQuery(symm);
    q.select(Symmetrix_.path( ).devices);

Consider yet another query that aims to select from a given storage array (e.g., Symmetrix) all the devices whose name begins with 456:

IEMObjectKey symm=new SymmetrixKey("123");
    IEmQuery q=QueryBuilder.createQuery(symm);
    q.select(Symmetrix_.path( ).devices).where(Sym Device_.path( ).name.like("456*"));

Consider yet another query that aims to select from a given storage array (e.g., Symmetrix) all the devices whose name begins with 456 and whose status is valid:

IEMObjectKey symm=new SymmetrixKey("123");
    IEmQuery q=QueryBuilder.createQuery(symm);
    q.select(Symmetrix_.path( ).devices).where(Sym Device_.path( ).name.like("456*").and (Sym Device_.path( ).status.eq("valid"));

It is noted that the criterion (name="456*") is applied to the devices after navigating from the storage array (e.g., Symmetrix).

Consider yet another query that aims to select the RDF group of the remote RDF device for device 456:

IEMObjectKey dev=new SymmetrixDeviceKey("123", "456");
    IEmQuery q=QueryBuilder.createQuery(dev);
    q.select(SymDevice_.path( ).remoteDevice.RDFGroup);

Consider yet another query that aims to select the devices from a pool, sorting ascending, case insensitive, by device name:

IEMObjectKey pool=new SymmetrixPoolKey("123", "mypool");
    IEmQuery q=QueryBuilder.createQuery(pool);
    q.select(SymmetrixPool_.path( ).devices).orderBy (SymDevice_.path( ).symDevName,
    EMOrderByClause. SortOrder.ASCENDING, new
    EMComparatorSelector("StringCaseInsensitive").

The classes in the meta model 300 may either be hand coded or generated from the OM. The meta model classes may provide strong typing, at the cost of code generation.

The path( ) method may retrieve meta model classes without directly specifying their name.

In some embodiments, the query language defined above is similar in some ways to the Criteria Query API defined by JPA 2.0. Such similarity may reduce the learning curve and permit a smooth migration, if necessary.

In some embodiments, the query language may not be fully type safe. For example, the origin and select components may need to be consistently specified. In embodiments in which it is not desirable to preserve JPA-like syntax, the query builder may be configured to enforce origin and select compatibility.

The query service 255 may be configured to not allow one-to-many-to-many selections. For example, the traversal Symmetrix_.path( ).pools.devices may not be supported.

The Origin concept may be considered a shortcut for an additional where, selecting the Origin: where(Symmetrix_.path( ).symmetrix.id.eq("123")). Since, in some embodiments, the Origin may be necessary for query execution, the EMQuery syntax may demand an Origin.

The query service 255 is a service that may be configured to create, execute, page, and persist queries. The query service 255 may be implemented as a stateless bean residing in the server 130. Generally, upon making a call, a stateless bean executes the call and then gets recycled. For query execution, the query service 255 may delegate to query executors, as discussed further below in conjunction with FIG. 7. To execute queries, the default reflective query executor may use Java reflection along with a class loader able to load OM classes. However, each OM may register a custom query executor to exploit OM specific properties, potentially yielding more efficient executors. The provider mechanism underlying the application service may be configured to allow the registration of OM-specific query executors.

In addition to the reflective query executor, the exemplary storage array manager (e.g., Univmax) may support additional OM-specific query executors, such as:

A SymDeviceFilterQueryExecutor, which may be configured to delegate directly to the filter service and indirectly to the storage array interface (e.g., Solutions Enabler) for executing queries on storage array (e.g., Symmetrix) devices.

A SymAuditFilterQueryExecutor, which may be configured to delegate to the storage array interface (e.g., Solutions Enabler) for executing queries on the exemplary storage array (e.g., Symmetrix) audit log.

Figure 7:
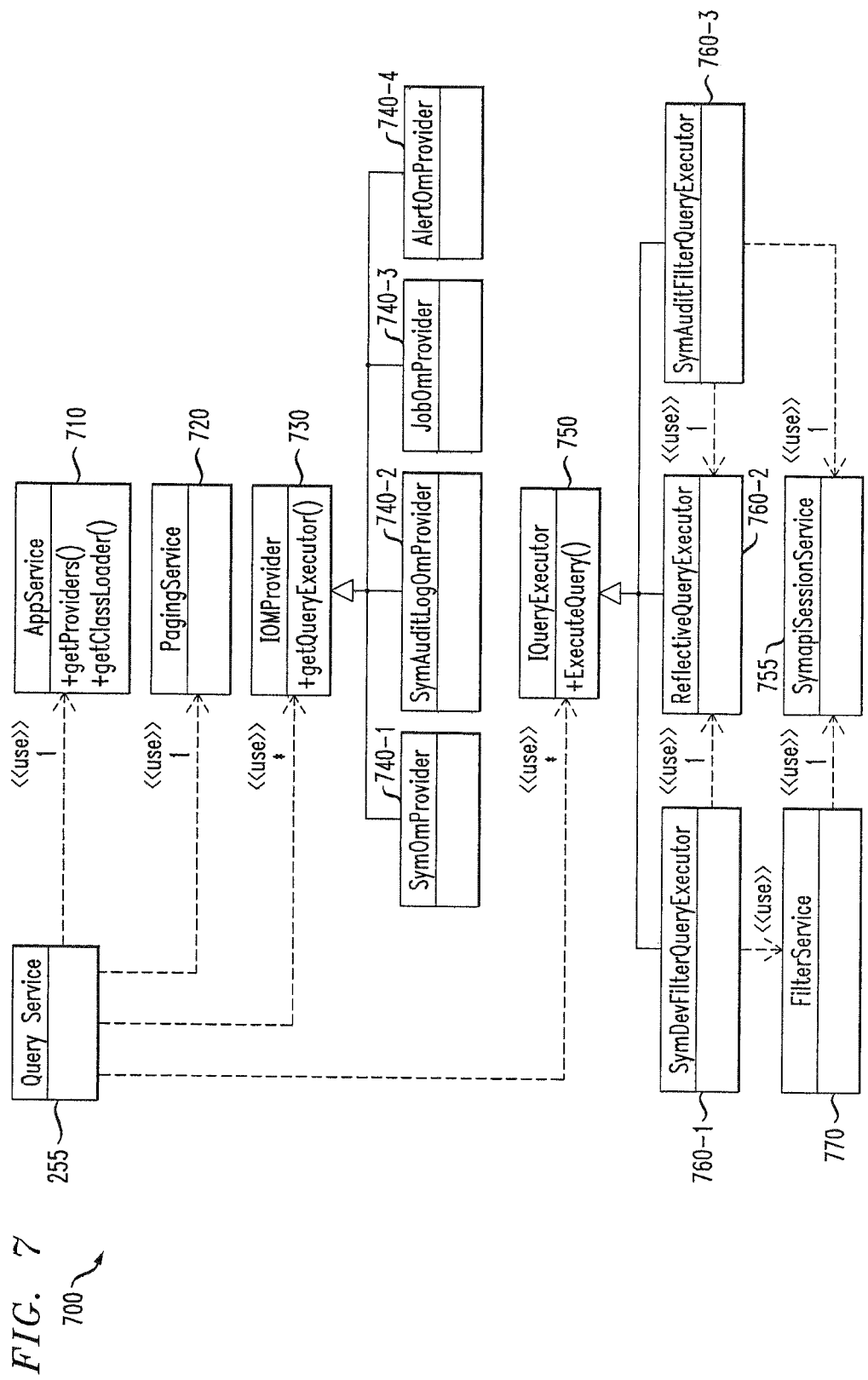
FIG. 7 is a UML diagram illustrating an example of a class model of the query service of FIG. 2 that may be used in connection with performing techniques described herein.

FIG. 7 is a diagram illustrating an example of a class model 700 of a query service 255 that may be used in connection with performing techniques described herein. FIG. 7 is merely an illustrative embodiment of such a class model, and is not intended to limit the scope of the invention. Any of numerous other implementations of a class model of a query service, for example, variations of the class model in FIG. 7, are possible and are intended to fall within the scope of the invention.

As noted above, the exemplary provider mechanism allows the query service 255 to delegate to an application service 710 to allow the registration of OM-specific query executors, and the selection of a particular query executor to process a given query. Then, upon receipt of a given query, the query service 255 can identify an appropriate query executor to handle the given query. For example, the application service 710, can issue a getProviders command to identify the various providers 730, 740 (see below) having corresponding query executors 750, 760 (see below) and the given query can be processed using one or more of a common query executor 760-2 for a plurality of domains and at least one domain specific query executor 760-1, 760-3. In addition, the application service 710 can optionally also register object model providers and/or class loaders (for object-model instance resolution) associated with each application and the object model providers can be requested to identify any domain specific query executors available to handle a given query.

Query results can be large; for example, an exemplary storage array (e.g., Symmetrix) may contain many hundreds of thousands, or even millions of devices. To guarantee adequate performance, the query service 255 may be configured to never return more than a predetermined number of objects, and the client can later page for additional query results. Similar to a database cursor, the query service 255 may be configured to delegate paging to a paging service 720.

The paging service 720 may be configured, for example, as a singleton Enterprise Java Bean (ejb) running in the server 130. When a client 110 closes a query, the paging service 720 may be configured to remove internally the corresponding query result. To prevent leaks, the paging service 720 may be configured to evict old query results, after a configurable expiration time. Clearly, clients 110 should not be enabled to page evicted query results.

As noted above, a common OM provider 730 can be provided to support object lookup by key and may expose a common query executor 750. In addition, one or more domain-specific OM providers 740-1 through 740-4 can be provided to support domain-specific object lookup by key and may expose one or more executor 760-1 through 760-3, such as the SymDeviceFilterQueryExecutor 760-1, a reflective (common) query executor 760-2 and the SymAuditFilterQueryExecutor 760-3.

For the exemplary Symmetrix OM, OM meta data and server-side DTOs may be generated directly from the OM interfaces using the Univmax generator. Client-side DTOs may be generated by the GraniteDS Gas 3 code generator. The Univmax generator may be configured to operate as follows:

For method calls in the OM that return primitive types or enums, emit a corresponding meta data method that returns an appropriately typed EMAttribute.

For @ARelationship annotated methods in the OM returning another OM object, emit a corresponding meta data method that returns the meta data of the returned OM object.

For @ARelationship annotated methods in the OM returning a collection of OM objects, emit a corresponding meta data method that returns a corresponding EMAttribute collection class.

Occasionally, clients require OM information not provided by the attributes and relationships in the (e.g., Symmetrix) OM. For example, clients may require data in Symapi structs, which is not currently exposed. Developers may encode the new required data in the dto.xml file, following the dto.xsd XML-Schema syntax. The Univmax generator may incorporate the dto.xml data while code generating.

To support a persisted-queries requirement, a stateless service SavedQueryManager (not shown) may optionally be configured to allow storing and restoring queries. Each query may be saved in a persisted associative array, mapping the query name and user id to the serializable query. Restored queries can then be executed as if clients actually created them.

Reflective (Common) Query Executor

The meta data classes may encode the method names in strings. For example, consider the getDevices( ) method of the exemplary Symmetrix class. The corresponding meta data method may be:

```
// Getter for relationship Collection<ISymDevice> getDevices
public EMCollectionAttribute getDevices( )
{
    return new EMCollectionAttribute(getNavPath( ), "getDevices");
}
```

Notice the stringification of the getDevices( ) method above. During selection traversal, the full traversal path may be encoded as a string array in the navigation path. Here the "getDevices" string may be appended to the current navigation path, invoked by getNavPath( ). The reflective query executor may be configured to sequentially invoke all the methods specified by the navigation path, through Java reflection. The reflective query service may be configured to evaluate the where and sort components, again through reflection, using the Recursive Descent algorithm. Finally, for ActionScript clients, the project component may be applied while generating the DTOs, just before dispatching the response back to the client.

Sage Advanced Data Grid

Further aspects of the invention may be implemented using a Sage Advanced Data Grid (SADG) and SymDeviceFilterDef Query Executor of Univmax made available by EMC Corporation of Hopkinton, Mass., for example, as will now be described. It should be appreciated that the following descriptions are presented as non-limiting illustrative examples of a DG component of a graphical user interface (GUI) and a query filter that may be used in various embodiments of the invention, but the invention is not so limited. A DG Component and query filter may be implemented in any of a variety of other ways. In addition, one or more elements of the DG Component or query filter may be combined in any of a variety of suitable ways, in addition to any combinations described below.

The exemplary Sage Advanced Data Grid, SADG, is a GUI component that may be used for displaying tabular data in a storage system manager (e.g., Univmax). FIG. 8 illustrates a portion of an exemplary screen shot 800 presenting a non-limiting example of a SADG GUI component displaying thin-volume data on an exemplary Symmetrix system (for example, Symmetrix 000195900063).

Figure 9:
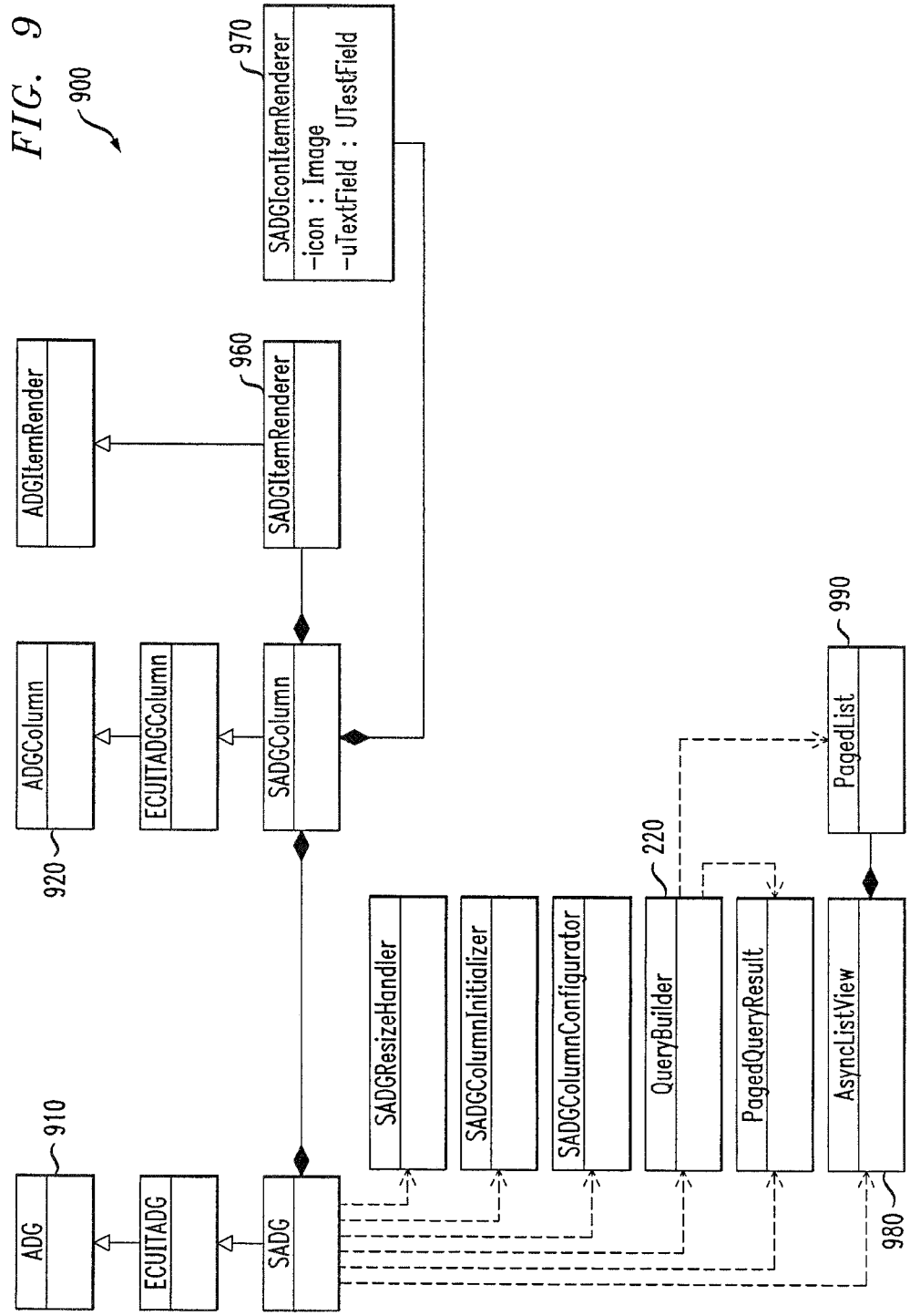
FIG. 9 is a UML diagram illustrating an example of a class model of an exemplary SADG GUI display component that may be used in connection with performing techniques described herein.

FIG. 9 is a diagram illustrating an example of a class model 900 of an exemplary SADG that may be used in connection with performing techniques described herein. FIG. 9 is merely an illustrative embodiment of such a class model, and is not intended to limit the scope of the invention. Any of numerous other implementations of a class model, for example, variations of the class model in FIG. 9, are possible and are intended to fall within the scope of the invention.

The SADG class 910 and SADGColumn class 920 conform to predefined style and look and feel guidelines.

Additionally, the class diagram 900 illustrates the Univmax column management customizations and the empowering integration with the query mechanism. Here, AsyncListView class 980 is an ActionScript collection embedding the freely-available PagedList auxiliary class 990 for grid scrolling.

In one exemplary embodiment, SADG may provide two modes of operation, namely, a presenter populate (P-SADG) mode and a query service populated (QS-SADG) mode, which will now be described in more detail.

In some embodiments, P-SADG provides one or more of the following functions:

The presenter retrieves a single page.
The presenter sorts in the client.
The presenter executes the query.
The presenter populates the data provider.
P-SADG population is procedural.
P-SADG lacks server-side custom column comparators.

In contrast, in some embodiments, QS-SADG provides one or more of the following functions:

QS-SADG can retrieve any page, on demand.
QS-SADG sorts in the server.
QS-SADG executes and pages the query.
QS-SADG conceals the data provider.
QS-SADG population is declarative.
QS-SADG supports server-side custom column comparators.

Using Macromedia eXtensible Markup Language (mxml), P-SADG and QS-SADG may be defined differently. P-SADG may be defined by:

```
<sage:SageAdvancedDataGrid
    dataProvider="{model.TableModel}"
```
where the presenter programmatically populates the table in the MVP model.
In contrast, QS-SADG may be defined declaratively by:
```
<sage:SageAdvancedDataGrid
    queryFactory="{presenter.createQuery}"
    grid="{presenter.getGrid}"
    orderBy="{Presenter.orderBy}"
    comparator="{Presenter.comparator}"
    initSortColumn="{Presenter.initSortColumn}"
``` concealing not only the data provider, but, more importantly, the data provider's population. To initiate population, the QS-SADG may invoke the query factory to generate a query. Consider the following exemplary query factory:

```
public function createQuery( ):IEMQuery {
    var query:IEMQuery;
    if (symmSelectionModel.hasSelection( )) {
        query =
        queryBuilder.createQuery(symmSelectionModel.getSelectedKey( ));
        query.select(Symmetrix_.path( ).devices);
    }
    return query;
}
``` where the query builder is injected by Parsley.

To populate the grid, the QS-SADG may be configured to invoke the grid function on a query result provided by the query service 255. Consider the following exemplary grid function:

```
public static function
getGrid(pagedQueryResult:PagedQueryResult):Vector.<Object> {
    var rows:Vector.<Object> = new Vector.<Object>( );
    for each (var volume:SymDeviceDTO in
    pagedQueryResult.resultList) {
        var row:SageGridRow = new SageGridRow( );
        row.addAttribute("Name", volume.symDevName);
        row.addAttribute("Type",
        volume.symapi_dev_config_t.formatString);
        row.Object = volume;
        rows.push(row);
    }
    return rows;
}
```

When a user clicks on a column header for columnar sorting, QS-SADG may be configured to invoke the orderBy function. Clearly, sorting must take place in the server 130, not in the client 110. Consider the following exemplary orderBy function:

```
static function orderBy(column:String):EMSingularAttribute {
    switch (column) {
    case "Name": return SymDevice_.path( ).symDevName;
    case "Type": return SymDevice_.path( ).symapi_dev_config_t;
    default: return null;
    }
}
```

In some embodiments, columnar sorting must be governed by customized comparators. For example, string columnar content may be sorted case sensitive or case insensitive. For optional server-side comparators, consider the following exemplary comparator function:

```
static function comparator(column:String):EMComparatorSelector {
    switch (column) {
    case "Name": return new
    EMComparatorSelector("StringCaseInsensitive");
    case "Type": return new EMComparatorSelector("EnumByLong");
    default: return null;
    }
}
```

QS-SADG may support one or more of the following comparators: EnumByFormatString, EnumByLong, StringAsDouble, StringAsHex, StringAsSymDir, and StringCaseInsensitive.

For an optional initial-sort column, consider the following exemplary initSortColumn function:

```
static function initSortColumn( ):SadgSortColumn {
return new SadgSortColumn("Capacity",
EMOrderByClause.ORDER_DESCENDING);
}
```

The following is a typical usage of QS-SADG, illustrating a QS-SADG refresh following a Symmetrix selection change:

```
[MessageHandler]
public function
symmScopeChanged(selChanged:SymmetrixSelectionChanged):void {
view.sadg.refresh( );
}
```

Column Width Configuration

The exemplary SADG may be configured to configure column widths automatically. Furthermore, when a user reduces a column's width, SADG may be configured to crop the displayed text accordingly, optionally appending an ellipsis as a visual clue.

FIG. 10 illustrates a portion of an exemplary screen shot 1000 presenting a non-limiting example of a SADG GUI component displaying thin-volume data on an exemplary Symmetrix system (for example, the Symmetrix 000195900063 of FIG. 8), where a user has reduced the width of the Pool Name column. As shown in FIG. 10, when the user reduced the width of the Pool Name column, SADG cropped the displayed text accordingly and appended ellipses as a visual clue.

Returning to FIG. 9, SADG may be configured to accomplish the column width configuration through two exemplary custom item renderers: SadgItemRenderer 960 and SadgIconItemRenderer 970; the exemplary SadgItemRenderer 960 manages textual columns, while the exemplary SadgIconItemRenderer 970 manages columns combining an icon with text. In one exemplary implementation, just before the SADG display and a brief settle down pause, SADG may be configured to compute the optimal width for the first viewable page. Specifically, for each column in the first viewable page, SADG may be configured to examine each cell, computing the minimal width required to display the entire cell content. SADG may be configured to set that column's width to the maximum of all that column's cell widths, in effect computing the max-min column width.

In P-SADG, the presenter may be enabled to load the data provider, and be charged with notifying P-SADG when the data provider is fully loaded, so that column-width calculations can proceed. In some embodiments, the presenter must invoke:

myView.myPSadg.dataProviderLoaded( );

Handling Projection Queries in QS-SADG

QS-SADG may be driven by a query service query. When that query involves a projection, the query service may be configured to return partially populated DTOs. Partially populated DTOs can immensely expedite the GUIs display. However, users may either activate controls depending on selected rows or select contextual actions; and both cases may require fully-populated DTOs. To populate the DTOs corresponding to the selected rows, QS-SADG may be configured to intercept both the selection-changed messages and the item-roll-over events to retrieve rapidly fully-populated DTOs. Consider the following non-limiting example of a Parsley message handler for the SelectionChangedMessage:

```
[MessageHandler]
public function handleVolumeSelectionChangeMessage(msg:SelectionChangedMessage):void
{
SymDeviceDTOPopulator.populate(view.ListGrid, queryBuilder, smcSelectionModel);
}
```

Here, the SymDeviceDTOPopulator rapidly invokes the query service to retrieve all the required fully-populated DTOs—before slow users have had a chance to activate any GUI operation.

SymDeviceFilterDef Query Executor

Symmetrix arrays, for example, may host hundreds of thousands, or even millions, of Symmetrix devices. Users may view, filter, partition, duplicate, delete, reconfigure, and select Symmetrix devices according to a variety of criteria. Consequently, optimizing queries involving Symmetrix devices may be desirable for providing a responsive and engaging user experience in Univmax. The SymDeviceFilterDef query executor 760-1 is an example of a domain-specific query executor that may be configured to leverage Solution Enabler's FilterService to accelerate queries involving Symmetrix devices. The SymDeviceFilterDef query executor 760-1 may be configured to integrate seamlessly with the query-service infrastructure.

SymDeviceFilterDef

SymDeviceFilterDef predicates represent criteria for filtering exemplary Symmetrix volumes. In many cases, SymDeviceFilterDef predicates are Univmax's representation of the predicates supported by Solution Enabler's (SE) FilterService.

Filter Service

The exemplary storage array interface (e.g., Solutions Enabler) provides a service to filter exemplary Symmetrix volumes based on various attributes of Symmetrix volumes. The FilterService may be configured to only evaluate conjunctions of the supported predicates. In addition, the FilterService can either include or exclude volumes based on an attribute value. Moreover, on a call to the FilterService, the filters may be applied to all of the volumes of the specified Symmetrix.

SymDeviceLeafPredicate

A SymDeviceLeafPredicate represents a conjunction of SymDeviceFilterDef predicates that the FilterService may be configured to execute in a single call to Solutions Enabler.

SymDeviceFilter Query Executor

The SymDeviceFilter query executor 760-1 may be invoked when the query's where clause contains SymDeviceFilterDef predicates. An illustrative embodiment will now be described of how the SymDeviceFilter query executor 760-1 supports arbitrary where clauses, despite the FilterService's limited expressibility.

The query's where clause first may be processed by SymDeviceFilter query executor 760-1 to identify and collapse some or all portions of the tree into SymDeviceLeafPredicates.

Figure 11A:
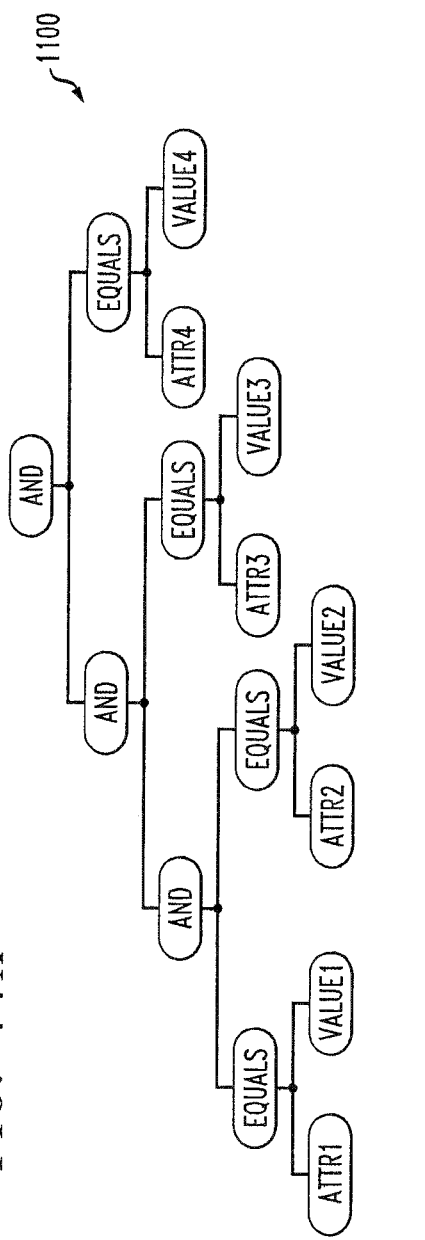
FIGS. 11A, 12A and 13A illustrate exemplary portions of a query tree that can be reduced using an exemplary domain specific query executor into corresponding leaf predicates shown in FIGS. 11B, 12B and 13B.
Figure 11B:
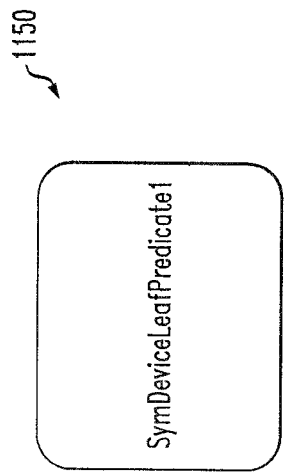

FIG. 11A illustrates an exemplary portion of a query tree 1100 that can be reduced using the exemplary SymDeviceFilter query executor 760-1 into the SymDeviceLeafPredicate1 1150 shown in FIG. 11B, where SymDeviceLeafPredicate1 1150 evaluates the expression attr1=value1 and attr2=value2 and attr3=value3 and attr4=value4.

Figure 12A:
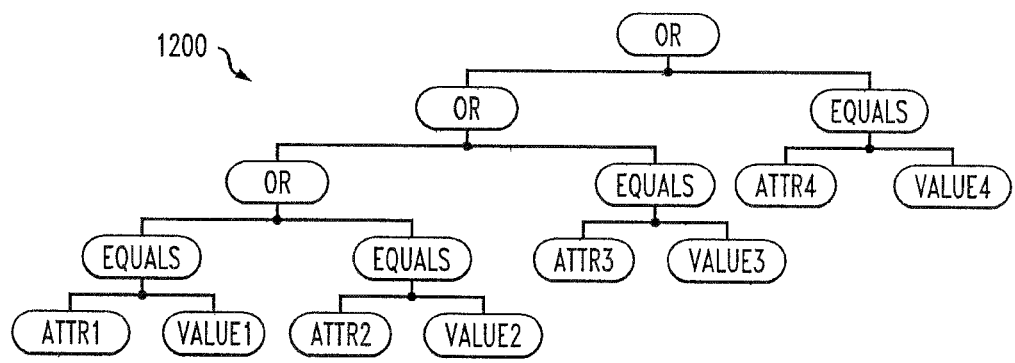
Figure 12B:
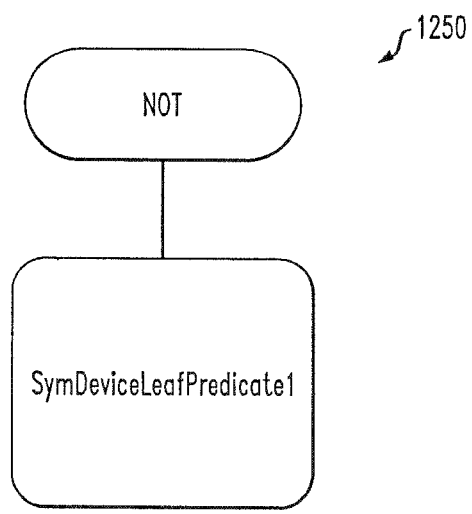

Similarly, FIG. 12A illustrates an exemplary portion of a query tree 1200 that can be reduced using the exemplary SymDeviceFilter query executor 760-1 into a SymDeviceLeafPredicate1 1250 shown in FIG. 12B, where SymDeviceLeafPredicate1 1250 evaluates the expression attr1!=value1 and attr2 !=value2 and attr3 !=value3 and attr4 !=value4, in a similar manner to FIG. 11B.

Figure 13A:
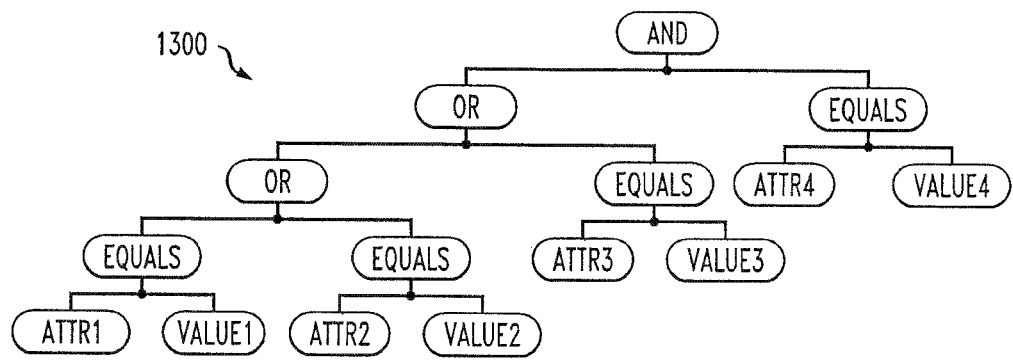
Figure 13B:
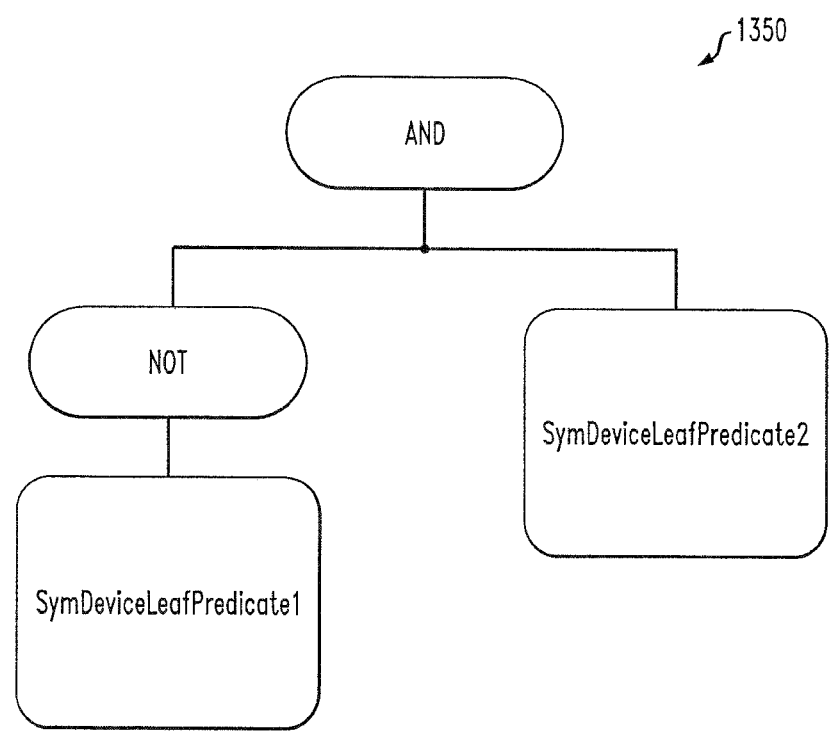

Finally, FIG. 13A illustrates an exemplary portion of a query tree 1300 that can be reduced using the exemplary SymDeviceFilter query executor 760-1 into SymDeviceLeafPredicate1 and SymDeviceLeafPredicate2 1350 shown in FIG. 13B, where SymDeviceLeafPredicate1 1250 evaluates the expression attr1!=value1 and attr2 !=value2 and attr3 !=value3 and SymDeviceLeafPredicate2 evaluates the expression attr4=value4

Linear where Clause Execution

In a naïve implementation, the FilterService may be configured to evaluate the SymDeviceLeafPredicate predicates repeatedly on each Symmetrix device. This naïve implementation yields an $O(n^2)$ algorithm—which may be prohibitive for large Symmetrix arrays.

To expedite the where-clause evaluation, the SymDeviceFilter query executor 760-1 may optionally be configured to traverse the SymDeviceLeafPredicate tree in post order simultaneously across all devices. In such an embodiment, each SymDeviceLeafPredicate can be evaluated at most once per all devices, rather than per individual device—leading to an efficient linear $O(n)$ algorithm.

CONCLUSION

In some embodiments of the invention, a system is configured with logic and/or a processor and memory to perform one or more of the acts described above and otherwise herein.

In some embodiments of the invention, one or more of the foregoing acts, or acts otherwise described herein, may be defined by computer-readable signals tangibly embodied on one or more computer-readable recordable media, for example, non-volatile recording media, integrated circuit memory elements, or a combination thereof.

The function and advantage of embodiments of the present invention described herein and other embodiments will be more fully understood from the examples described herein, and the accompanying drawings, which are schematic and are not intended to be drawn to scale. The presented examples are intended to facilitate a better understanding and illustrate the benefits of the present invention, but do not exemplify the full scope of the invention.

As used herein, the terms "comprising," "including," "carrying," "having," "containing," "involving," and the like are to be understood to be open-ended, i.e., to mean including but not limited to. As used herein, "plurality" means two or more.

As used herein, a "network" (e.g., a network between a server and client, a network between a server and a storage array, the cloud in FIG. 1) may include one or more segments of transmission media over which communications may be exchanged between network components (e.g., clients, servers, switches, storage arrays, or the like, or a suitable combination of any of the foregoing). Each segment may be any of a plurality of types of transmission media, including: one or more electrical or optical wires or cables made of metal and/or optical fiber, air (e.g., using wireless transmission over carrier waves) or any suitable combination of these transmission media. A network may include, without limitation, a Connectrix, a repeater, a switch, a hub, a multiplexer, other switching elements, a satellite, other known or later developed network elements, or any suitable combination of any of the foregoing. A network may be or include any of a variety of types of networks that enable communication between components such as, for example, the Internet, an intranet, a data network, an optical network, a computer network, a communication network, a telephony network, a wireless network, a Local Area Network (LAN), a Metropolitan Area Network (MAN), a Wide Area Network (WAN), or any suitable combination of the foregoing, and may employ any of a variety of known or later developed communication technologies and/or protocols such as, for example, Ethernet, TCP/IP, UDP and related technologies and protocols, to name just a few. It should be appreciated that a network may be as simple as a single wire, bus, wireless connection, or other type of segment interconnecting two or more components. Further, it should be appreciated that a network may be considered to include one or more of the components that it connects, or sub-components thereof, for example, one or more sub-components of a client, server, switch or storage array.

Methods, methodologies and techniques described herein, and acts thereof, various embodiments and variations of these methods, methodologies, techniques and acts, individually or in combination, may be defined by computer-readable signals tangibly embodied on one or more computer-readable recordable media, for example, non-volatile recording media, integrated circuit memory elements, or a combination thereof. Computer readable recordable media can be any available media that can be accessed by a computer. By way of example, and not limitation, computer readable recordable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other semiconductor memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein, and/or various embodiments, variations and combinations thereof. Such instructions may be written in any of a plurality of programming languages or scripts, for example, Java, J#, Visual Basic, C, C#, or C++, Perl, Fortran, Pascal, Eiffel, Basic, COBOL, etc., or any of a variety of combinations thereof. The computer-readable media on which such instructions are embodied may reside on one or more of the components of any of the systems described herein, may be distributed across one or more of such components, and may be in transition there between.

The computer-readable recordable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a system that performs any of the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

What is claimed is:

1. A method, comprising:
   in response to an initial a user request:
      obtaining an object model (OM) data object comprising retrieved control path data, wherein the retrieved control path data comprises data about a given device; and
      storing said OM data object in a cache using one or more façade data classes generated from an application object model;
   employing a refresh service to (i) register for one or more notifications from a storage array, (ii) monitor cache refresh events from the storage array that impact a validity of said OM data object, and (iii) evict said OM data object from said cache in response to said validity of said OM data object being impacted by one of said cache refresh events; and
   in response to a subsequent user request:
   delivering said OM data object from said cache in response to said OM data object remaining in said cache at a time of said subsequent user request.

2. The method of claim 1, wherein said facade data classes are generated from said application object model using code generation techniques.

3. The method of claim 2, wherein said facade data classes are transparent to a user.

4. The method of claim 1, wherein said facade data classes employ weak garbage collection references.

5. The method of claim 1, wherein the one or more notifications lead to a minimum necessary cache eviction.

6. The method of claim 1, wherein any subsequent access to an evicted OM data object triggers a call to repopulate the cache with the evicted OM data object.

7. The method of claim 1, further comprising the step of storing relationship objects for each user in said cache.

8. A system for processing control path data in a storage array, comprising:
   a memory; and
   at least one processing device, coupled to the memory, operative to implement the following steps:
   in response to a user request:
      obtaining an object model (OM) data object comprising retrieved control path data, wherein the retrieved control path data comprises data about a given device; and
      storing said OM data object in a cache using one or more façade data classes generated from an application object model;
   employing a refresh service to (i) register for one or more notifications from a storage array, (ii) monitor cache refresh events from the storage array that impact a validity of said OM data object, and (iii) evict said OM data object from said cache in response to said validity of said OM data object being impacted by one of said cache refresh events; and in response to a subsequent user request:

delivering said OM data object from said cache in response to said OM data object remaining in said cache at a time of said subsequent user request.

9. The system of claim 8, wherein said facade data classes are generated from said application object model using code generation techniques.

10. The system of claim 9 wherein said facade data classes are transparent to a user.

11. The system of claim 8, wherein said facade data classes employ weak garbage collection references.

12. The system of claim 8, wherein the one or more notifications lead to a minimum necessary cache eviction.

13. The system of claim 8, wherein any subsequent access to an evicted OM data object triggers a call to repopulate the cache with the evicted OM data object.

14. The system of claim 8, further comprising the step of storing relationship objects for each user in said cache.

15. A computer program product for processing control path data in a storage array, comprising a tangible machine-readable storage medium having encoded therein executable code of one or more software programs, wherein the one or more software programs when executed by at least one processing device perform the following steps:

in response to a user request:

obtaining an object model (OM) data object comprising retrieved control path data, wherein the retrieved control path data comprises data about a given device; and storing said OM data object in a cache using one or more façade data classes generated from an application object model;

employing a refresh service to (i) register for one or more notifications from a storage array, (ii) monitor cache refresh events from the storage array that impact a validity of said OM data object, and (iii) evict said OM data object from said cache in response to said validity of said OM data object being impacted by one of said cache refresh events; and in response to a subsequent user request:

delivering said OM data object from said cache in response to said OM data object remaining in said cache at a time of said subsequent user request.

16. The computer program product of claim 15, wherein said facade data classes are generated from said application object model using code generation techniques.

17. The computer program product of claim 16, wherein said facade data classes are transparent to a user.

18. The computer program product of claim 15, wherein said facade data classes employ weak garbage collection references.

19. The computer program product of claim 15, wherein the one or more notifications lead to a minimum necessary cache eviction.

20. The computer program product of claim 15, further comprising the step of storing relationship objects for each user in said cache.

* * * * *

UNITED STATES PATENT AND TRADEMARK OFFICE
CERTIFICATE OF CORRECTION

PATENT NO. : 11,144,551 B2  
APPLICATION NO. : 16/369904  
DATED : October 12, 2021  
INVENTOR(S) : Ilya Liubovich et al.

Page 1 of 1

It is certified that error appears in the above-identified patent and that said Letters Patent is hereby corrected as shown below:

In the Claims

Column 20, Line 19, in Claim 1, replace "in response to an initial a user request:" with -- in response to a request: --

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*